(12) United States Patent
McIntosh et al.

(10) Patent No.: US 9,767,845 B2
(45) Date of Patent: Sep. 19, 2017

(54) ACTIVATING A VIDEO BASED ON LOCATION IN SCREEN

(71) Applicant: REDUX, INC., Berkeley, CA (US)

(72) Inventors: David McIntosh, Del Mar, CA (US); Chris Pennello, Berkeley, CA (US)

(73) Assignee: ALC HOLDINGS, INC., San Francisco, CA (US)

( * ) Notice: Subject to any disclaimer, the term of this patent is extended or adjusted under 35 U.S.C. 154(b) by 50 days.

(21) Appl. No.: 14/173,753

(22) Filed: Feb. 5, 2014

(65) Prior Publication Data

US 2014/0223307 A1 Aug. 7, 2014

Related U.S. Application Data

(60) Provisional application No. 61/761,096, filed on Feb. 5, 2013, provisional application No. 61/822,105, filed
(Continued)

(51) Int. Cl.
| | |
|---|---|
| *G06F 3/00* | (2006.01) |
| *G11B 27/031* | (2006.01) |
| *G11B 20/00* | (2006.01) |
| *G11B 27/034* | (2006.01) |
| *G11B 27/036* | (2006.01) |

(Continued)

(52) U.S. Cl.
CPC .......... *G11B 27/031* (2013.01); *G06F 3/0484* (2013.01); *G06F 3/04842* (2013.01); *G06F 3/04855* (2013.01); *G06K 9/00751* (2013.01); *G11B 20/00007* (2013.01); *G11B 27/034* (2013.01); *G11B 27/036* (2013.01); *G11B 27/102* (2013.01); *G11B 27/105* (2013.01); *G11B 27/34* (2013.01); *H04N 5/04* (2013.01); *H04N 21/47217* (2013.01); *H04N 21/482* (2013.01); *H04N 21/8455* (2013.01); *H04N 21/8549* (2013.01)

(58) Field of Classification Search
CPC ..... G11B 27/34; G11B 27/034; G11B 27/105; G11B 27/28; G11B 27/11; G11B 27/22; G11B 27/005; G11B 2240/41; G11B 2220/61; G11B 19/022; G11B 19/025; G11B 2220/65; G11B 27/032; G11B 27/036
See application file for complete search history.

(56) References Cited

U.S. PATENT DOCUMENTS

| | | |
|---|---|---|
| 5,630,105 A | 5/1997 | Itagaki |
| 5,745,103 A | 4/1998 | Smith |

(Continued)

OTHER PUBLICATIONS

Non-Final Rejection, dated May 28, 2015, for U.S. Appl. No. 14/173,697, filed Feb. 5, 2014, 14 pages.

(Continued)

*Primary Examiner* — Di Xiao
(74) *Attorney, Agent, or Firm* — Kilpatrick Townsend & Stockton LLP

(57) ABSTRACT

Providing a method for browsing portions of videos called video previews. The video previews may be associated with a link or predefined duration of a full video, such that the video preview is generated from a portion of the full video and viewed by a user. The video previews are configured to play a series of images associated with images from the portion of the full video when the video preview is activated.

30 Claims, 9 Drawing Sheets

Related U.S. Application Data on May 10, 2013, provisional application No. 61/847,996, filed on Jul. 18, 2013, provisional application No. 61/905,772, filed on Nov. 18, 2013.

(51) Int. Cl.

| | | |
|---|---|---|
| H04N 5/04 | (2006.01) | |
| G06F 3/0484 | (2013.01) | |
| H04N 21/482 | (2011.01) | |
| H04N 21/8549 | (2011.01) | |
| G11B 27/34 | (2006.01) | |
| H04N 21/472 | (2011.01) | |
| H04N 21/845 | (2011.01) | |
| G11B 27/10 | (2006.01) | |
| G06F 3/0485 | (2013.01) | |
| G06K 9/00 | (2006.01) | |

(56) References Cited

U.S. PATENT DOCUMENTS

| | | | |
|---|---|---|---|
| 5,781,183 A | 7/1998 | Takahashi et al. | |
| 6,335,985 B1 | 1/2002 | Sambonsugi et al. | |
| 6,526,577 B1 | 2/2003 | Knudson | |
| 7,324,119 B1 | 1/2008 | Puri et al. | |
| 7,840,661 B2 | 11/2010 | Kalaboukis et al. | |
| 7,844,352 B2 | 11/2010 | Vouzis et al. | |
| 7,844,354 B2 * | 11/2010 | Keohane | G06F 3/165 |
| | | | 700/94 |
| 8,244,103 B1 | 8/2012 | Shore | |
| 8,527,646 B2 | 9/2013 | Khatib et al. | |
| 8,610,730 B1 | 12/2013 | Negulescu et al. | |
| 8,923,607 B1 | 12/2014 | Kwatra et al. | |
| 9,024,868 B2 | 5/2015 | Oka | |
| 9,027,064 B1 | 5/2015 | Opare-Abetia et al. | |
| 9,077,956 B1 | 7/2015 | Morgan et al. | |
| 9,349,413 B2 | 5/2016 | Pennello et al. | |
| 9,378,283 B2 | 6/2016 | Batraski | |
| 2001/0023200 A1 | 9/2001 | Horikawa et al. | |
| 2001/0025375 A1 | 9/2001 | Ahmad et al. | |
| 2002/0112244 A1 | 8/2002 | Liou et al. | |
| 2004/0010687 A1 | 1/2004 | Futa | |
| 2005/0019015 A1 | 1/2005 | Ackley et al. | |
| 2005/0091686 A1 | 4/2005 | Sezan et al. | |
| 2005/0193341 A1 | 9/2005 | Hayward et al. | |
| 2005/0257152 A1 | 11/2005 | Shimizu | |
| 2006/0059504 A1 | 3/2006 | Gomez | |
| 2006/0272000 A1 | 11/2006 | Kwak et al. | |
| 2006/0275028 A1 | 12/2006 | Lee | |
| 2007/0006262 A1 | 1/2007 | Cleron et al. | |
| 2007/0074269 A1 | 3/2007 | Hua et al. | |
| 2007/0136750 A1 * | 6/2007 | Abanami | H04N 5/44543 |
| | | | 725/44 |
| 2007/0245379 A1 | 10/2007 | Agnihortri et al. | |
| 2008/0036917 A1 | 2/2008 | Pascarella | |
| 2008/0136790 A1 * | 6/2008 | Hio | G06F 3/04817 |
| | | | 345/173 |
| 2008/0155474 A1 | 6/2008 | Duhig et al. | |
| 2008/0178230 A1 | 7/2008 | Eyal et al. | |
| 2008/0178234 A1 | 7/2008 | Eyal et al. | |
| 2008/0204465 A1 | 8/2008 | McGowan et al. | |
| 2008/0273804 A1 | 11/2008 | Malewski | |
| 2008/0301579 A1 | 12/2008 | Jonasson et al. | |
| 2009/0094159 A1 | 4/2009 | Cunningham et al. | |
| 2009/0110363 A1 | 4/2009 | Kim | |
| 2009/0172197 A1 | 7/2009 | Kalaboukis et al. | |
| 2009/0199251 A1 | 8/2009 | Badoiu et al. | |
| 2009/0249421 A1 | 10/2009 | Liu | |
| 2010/0023984 A1 | 1/2010 | Davi et al. | |
| 2010/0070523 A1 | 3/2010 | Delgo | |
| 2010/0125875 A1 | 5/2010 | Hays et al. | |
| 2010/0186034 A1 | 7/2010 | Walker et al. | |
| 2010/0232518 A1 | 9/2010 | Coleman et al. | |
| 2010/0260468 A1 | 10/2010 | Khatib et al. | |
| 2011/0007087 A1 | 1/2011 | Ivanich et al. | |
| 2011/0185392 A1 | 7/2011 | Walker et al. | |
| 2012/0014533 A1 | 1/2012 | Gough | |
| 2012/0017150 A1 | 1/2012 | Pollack et al. | |
| 2012/0079529 A1 | 3/2012 | Harris et al. | |
| 2012/0099641 A1 | 4/2012 | Bekiares et al. | |
| 2012/0120095 A1 | 5/2012 | Yoshitani et al. | |
| 2012/0141095 A1 | 6/2012 | Schwesinger | |
| 2012/0173981 A1 | 7/2012 | Day et al. | |
| 2012/0201517 A1 | 8/2012 | Sakuragi et al. | |
| 2012/0278725 A1 * | 11/2012 | Gordon | H04N 21/2665 |
| | | | 715/738 |
| 2012/0278764 A1 * | 11/2012 | Arriola | G06F 17/30058 |
| | | | 715/835 |
| 2012/0290933 A1 | 11/2012 | Rajaraman | |
| 2012/0314943 A1 | 12/2012 | Guerrero et al. | |
| 2012/0323897 A1 | 12/2012 | Daher | |
| 2012/0328265 A1 | 12/2012 | Sakuragi et al. | |
| 2013/0007198 A1 | 1/2013 | Gupta et al. | |
| 2013/0018960 A1 | 1/2013 | Knysz | |
| 2013/0024895 A1 | 1/2013 | Yong | |
| 2013/0031219 A1 * | 1/2013 | Liu | H04N 21/234 |
| | | | 709/219 |
| 2013/0042271 A1 | 2/2013 | Yellin | |
| 2013/0047084 A1 * | 2/2013 | Sanders | G06F 17/30053 |
| | | | 715/716 |
| 2013/0097238 A1 | 4/2013 | Rogers et al. | |
| 2013/0097550 A1 | 4/2013 | Grossman | |
| 2013/0129317 A1 | 5/2013 | Moorer | |
| 2013/0163963 A1 | 6/2013 | Crosland et al. | |
| 2013/0174197 A1 | 7/2013 | Gunatilake et al. | |
| 2013/0317951 A1 * | 11/2013 | Kuznetsov | G06F 17/30817 |
| | | | 705/27.1 |
| 2014/0104494 A1 * | 4/2014 | Begeja | H04N 5/44591 |
| | | | 348/564 |
| 2014/0130080 A1 | 5/2014 | Badoiu et al. | |
| 2014/0143725 A1 * | 5/2014 | Lee | G06F 17/30017 |
| | | | 715/834 |
| 2014/0169766 A1 | 6/2014 | Yu et al. | |
| 2014/0219629 A1 | 8/2014 | McIntosh et al. | |
| 2014/0219634 A1 | 8/2014 | McIntosh et al. | |
| 2014/0219637 A1 | 8/2014 | McIntosh et al. | |
| 2014/0223306 A1 | 8/2014 | McIntosh et al. | |
| 2014/0223482 A1 | 8/2014 | McIntosh et al. | |
| 2014/0325568 A1 | 10/2014 | Hoang et al. | |
| 2014/0359656 A1 | 12/2014 | Banica et al. | |
| 2015/0138406 A1 | 5/2015 | Sokeila | |
| 2016/0064034 A1 | 3/2016 | McIntosh et al. | |
| 2016/0217826 A1 | 7/2016 | McIntosh et al. | |

OTHER PUBLICATIONS

Restriction Requirement, dated Jun. 19, 2015, for U.S. Appl. No. 14/173,740, filed Feb. 5, 2014, 8 pages.
Non-Final Rejection, dated Jul. 16, 2015, for U.S. Appl. No. 14/173,715, filed Feb. 5, 2014, 18 pages.
Final Office Action dated Feb. 25, 2016, for U.S. Appl. No. 14/173,697, filed Feb. 5, 2014, 16 pages.
Non-Final Rejection, dated Feb. 11, 2016, for U.S. Appl. No. 14/173,745, filed Feb. 5, 2014, 15 pages.
Non-Final Office Action dated Dec. 17, 2015, for U.S. Appl. No. 14/173,732, 12 pages.
Notice of Allowance and Fees Due Mailed Jan. 13, 2016, for U.S. Appl. No. 14/173,715, 5 pages.
Notice of Allowance dated Sep. 11, 2015, in U.S. Appl. No. 14/173,740, 9 pages.
Corrected Notice of Allowance issued Nov. 8, 2016, in U.S. Appl. No. 14/173,697, 2 pages.
Advisory Action issued Oct. 17, 2016, in U.S. Appl. No. 14/173,732, 4 pages.
Non-Final Office Action issued Nov. 21, 2016, in U.S. Appl. No. 14/173,732, 18 pages.
Non-Final Rejection dated Sep. 23, 2016, for U.S. Appl. No. 14/937,557, 12 pages.
Notice of Allowance dated Sep. 21, 2016, in U.S. Appl. No. 14/173,745, 16 pages.

(56) References Cited

OTHER PUBLICATIONS

Final Office Action issued Jul. 26, 2016, in U.S. Appl. No. 14/173,732, 18 pages.
Corrected Notice of Allowance issued Nov. 25, 2015, in U.S. Appl. No. 14/173,740, 2 pages.
Final Office Action issued Feb. 25, 2016, in U.S. Appl. No. 14/173,697, 17 pages.
Non Final Office Action issued May 28, 2015, in U.S. Appl. No. 14/173,697, 14 pages.
Notice of Allowance issued Aug. 31, 2016, in U.S. Appl. No. 14/173,697, 7 pages.
Non Final Office Action issued Jul. 16, 2016, in U.S. Appl. No. 14/173,715, 180 pages.
Non-Final Office Action issued Apr. 12, 2017, in U.S. Appl. No. 15/091,358, 21 pages.

* cited by examiner

US 9,767,845 B2

ACTIVATING A VIDEO BASED ON LOCATION IN SCREEN

CROSS-REFERENCE TO RELATED APPLICATIONS

This application is a non-provisional application of U.S. Patent Application No. 61/761,096, filed on Feb. 5, 2013, U.S. Patent Application No. 61/822,105, filed on May 10, 2013, U.S. Patent Application No. 61/847,996, filed on Jul. 18, 2013, and U.S. Patent Application No. 61/905,772, filed on Nov. 18, 2013, which are herein incorporated by reference in their entirety for all purposes.

This application is related to commonly owned and concurrently filed U.S. patent application Ser. No. 14/173,697, entitled "Video Preview Creation with Link", U.S. patent application Ser. No. 14/173,715, entitled "User Interface for Video Preview Creation", U.S. patent application Ser. No. 14/173,732, entitled "Video Preview Creation based on Environment", U.S. patent application Ser. No. 14/173,740, entitled "Video Preview Creation with Audio", U.S. patent application Ser. No. 14/173,745, entitled "Generation of Layout of Videos", which are herein incorporated by reference in their entirety for all purposes.

BACKGROUND

Users commonly provide video content to websites (e.g., YouTube®), which can be referred to as "posting a video." For example, the user can associate a title, a static thumbnail image, and/or a textual description with the video. Other users (e.g., viewers) can access and view this content via the websites. For example, the viewers can see a video's title and static thumbnail of the video before deciding whether to play the full video. However, the viewers may find it difficult to select particular videos of interest because the title may not be descriptive of the contents of the video, the static thumbnail image may not summarize the essence of the video, or the textual description with the video may be a poor signal for whether the video will be interesting to the viewer. Thus, the viewers may spend significant amounts of time searching and watching videos that are not enjoyable to the viewer.

Additionally, if the viewer selects and starts watching a video, it often takes the viewer a significant amount of time before the viewer can determine whether they like the video and want to keep watching, or whether they want to select another video. When the videos are relatively short (e.g., 3 minutes), the viewer may watch a substantial portion of the video before they can determine whether they would be interested in viewing the video. This process can often be frustrating to a viewers who are accustomed to instant gratification provided by other consumer internet services, and the viewers may stop watching internet videos because it takes too long for them to find an interesting video to watch.

SUMMARY

Embodiments of the present invention provide methods, systems, and apparatuses for viewing portions of videos called "video previews." Once the video previews are created, they may be associated with a video channel (e.g., a collection of videos) for a viewer to browse. Each video channel or video in a channel can provide short, playable video preview that users can view to better decide whether to watch the full video or video channel. For example, when the video preview moves to a particular location on a display, the video preview may start playing (e.g., within a frame object). In another example, if the viewer selects a video preview, a full video associated with the video preview can be provided. In another example, a video preview can represent the video channel or collection, and a selection of the video preview can provide an interface with video previews of the videos of the channel. Also, embodiments can organize video previews and channels to be visually pleasing and efficient for a viewer.

Other embodiments are directed to systems and computer readable media associated with methods described herein.

A better understanding of the nature and advantages of the present invention may be gained with reference to the following detailed description and the accompanying drawings.

DEFINITIONS

Figure 1:
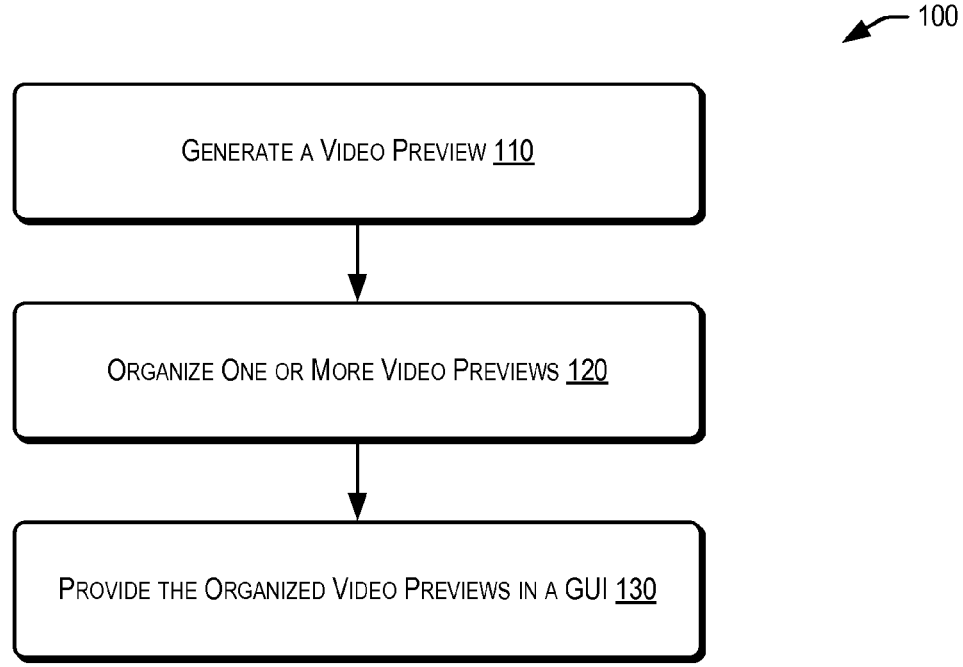
FIG. 1 shows a flowchart illustrating a method of creating a video preview, organizing the video previews, and providing a user interface that includes the video previews according to an embodiment of the present invention.

A "video preview" is a visual representation of a portion of a video (also referred to as a "full video" to contrast a "video preview" of the video). The full video may correspond to the entirety of a video file or a portion of the video file, e.g., when only a portion of the video file has been streamed to a user device. The preview may be shorter than the full video and the full video can be shorter than the complete video file. The preview can convey the essence of the full video. The video preview is shorter (e.g., fewer images, less time) than a full (e.g., more images, longer time, substantially complete) video. In various embodiments, a preview can be a continuous portion of the full video or include successive frames that are not continuous in the full video (e.g., two successive frames of the preview may actually be one or more seconds apart in the full video).

A "frame object" is an object on a GUI that is configured to play a video previews (e.g., an iframe, a frame in a current window, frame buffer object (FBO)). Frame objects (e.g., placeholders, 2-dimensional boxes, windows, squares) can be generated by a computing device for displaying the video preview. In some embodiments, the frame object will also provide filters or effects for the video preview (e.g., defined by the computing device, defined by a programming language that generates a frame object class).

A "composite of video previews" (also referred to simply as a "composite" or "preview composite") is an area where one or more related video previews will be played. If the composite has one video preview, then the composite simply corresponds to playing the preview. When the composite includes multiple previews, many frame objects can be associated with each other, each playing a video preview. The video previews in a composite can each link to the same full video. In one embodiment, the creator of a preview can identify the previews to include in a composite, and the composite can exist as a single display object, where the previews of the composite start playing at the time the composite is activated. The shape of a composite of video previews can be a square (2 blocks×2 blocks, N blocks×N blocks) or rectangle (1×N, 2×N, 2×2 with blocks comprising unequal sides, N×N with blocks comprising unequal sides). The composite of video previews may have a right-wise or left-wise orientation.

A "cluster of video previews" (also referred to simply as a "cluster") is a group of composites that are grouped together because they are related in some way. In one embodiment, the composites may relate to each other and be placed in a cluster imply by being next to each other in a stream of video previews pulled from a queue by a computing device. In another embodiment, the composites in a cluster may be filtered by category, popular items, and/or trending items, and thus the composites of a cluster may be related to each by the matching filter criteria. Each composite in the cluster can link to different full videos.

A "channel" or "collection" is a group of related videos that is accessible by a user and organized in a layout. For example, a user may decide to associate three composites (e.g., video previews relating to baking a cake, baking a cookie, and freezing ice cream) in a single collection called "Desserts I Love." Once the user associates the three composites, the composites may form a cluster. The cluster may be organized in a layout that will make it aesthetically pleasing for other users to view the cluster. The user can access their collection called "Desserts I Love" through a web browser, like a bookmarked area or toolbar, at a later time. Once the user accesses their collection, each of the composites that the user has associated with this collection can be displayed so the user can easily access them again.

DETAILED DESCRIPTION

Embodiments of the present invention can enhance video viewing by providing short, playable video previews. Users or viewers (used interchangeably) can watch the video previews provided through a website, computing device, messaging service, television, or other devices to better decide whether to watch a full video or channel of videos.

I. Providing Video Previews

FIG. 1 shows a flowchart illustrating a method 100 of creating a video preview, organizing the video previews, and providing a user interface that includes the video previews according to an embodiment of the present invention. The method 100 may comprise a plurality of steps for implementing an embodiment of creating a video preview with a link performed by various computing devices (e.g., video server, provider server, user device, third party server).

At step 110, a video preview may be generated. Embodiments of the invention may provide a graphical user interface for a user that allows the user to select a portion of a video (e.g., a full video) to use as a video preview. The system may generate the video preview based on the input received from the user. The input may be active (e.g., the user providing an identification of a video portion of a full video) or passive (e.g., a plurality of users view a section of the full video a threshold number of times, which identifies a video portion of a full video). Additional means of generating video previews can be found in U.S. patent application Ser. No. 14/173,697, entitled "Video Preview Creation with Link", U.S. patent application Ser. No. 14/173,715, entitled "User Interface for Video Preview Creation", U.S. patent application Ser. No. 14/173,732, entitled "Video Preview Creation based on Environment", and U.S. patent application Ser. No. 14/173,740, entitled "Video Preview Creation with Audio", which are incorporated by reference in their entirety.

At step 120, one or more video previews may be organized into one or more channels or collections. For example, the method 100 can associate the video preview generated in step 110 (e.g., a 4-second animated GIF of a snowboarder jumping off a ledge) with a channel (e.g., a collection of videos about snowboarders). In some embodiments, the video previews may be organized in a group (e.g., a composite, a playable group, a cluster of video previews) and displayed on a network page. Additional information about the organization and layout of video previews can be found in U.S. patent application Ser. No. 14/173,745, entitled "Generation of Layout of Videos", which is incorporated by reference in its entirety.

At step 130, a GUI may be provided with the video previews. For example, the GUI may provide one or more channels (e.g., channel relating to snowboarders, channel relating to counter cultures), one or more videos within a channel (e.g., a first snowboarding video, a second snowboarding video, and a first counter culture video), or a network page displaying one or more video previews. The video previews may be shared through social networking pages, text messaging, or other means.

II. System for Providing Video Previews

Various systems and computing devices can be involved with various workflows used to activate a video based on a location in a screen.

Figure 2:
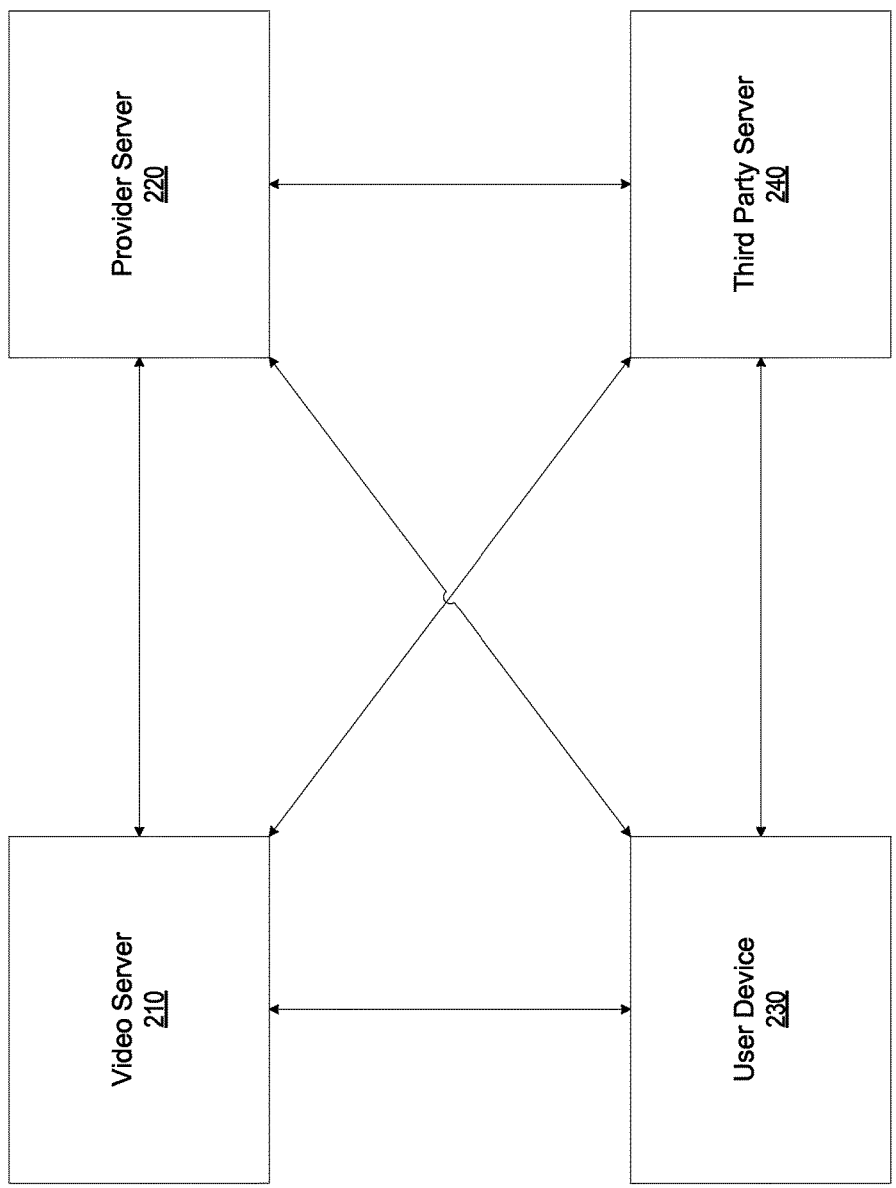
FIG. 2 shows block diagrams of various subsystems used to generate or provide a video preview.

FIG. 2 shows block diagrams of various subsystems used to generate or provide a video preview. For example, the computing devices can include a video server 210, a provider server 220, a user device 230, or a third party server 240 according to an embodiment of the present invention. In some embodiments, any or all of these servers, subsystems, or devices may be considered a computing device.

The computing devices can be implemented various ways without diverting from the essence of the invention. For example, the video server 210 can provide, transmit, and store full videos and/or video previews (e.g., Ooyala®, Brightcove®, Vimeo®, YouTube®, CNN®, NFL®, Hulu®, Vevo®). The provider server 220 can interact with the video server 210 to provide the video previews. In some embodiments, the provider server 220 can receive information to generate the video preview (e.g., a timestamp to a location in the full video, the link to the full video, the full video file, a push notification including the link to the full video). The user device 230 can receive a video preview and/or full video to view, browse, or store the generated video previews. The third party server 240 can also receive a video preview and/or full video to view or browse the generated video previews. In some embodiments, the user device 230 or third party server 240 can also be used to generate the video preview or create a frame object. Additional information about the video server 210, provider server 220, user device 230, and third party server 240 can be found in U.S. patent application Ser. No. 14/173,697, entitled "Video Preview Creation with Link" and U.S. patent application Ser. No. 14/173,715, entitled "User Interface for Video Preview Creation", which are incorporated by reference in their entirety.

In some embodiments, the video server 210, provider server 220, a user device 230, and third party server 240 can be used to activate a video preview. For example, the computing device (e.g., provider server 220, user device 230) may receive a video preview that comprises one or more images. The images may be associated with a video portion of the full video that corresponds to a series of images from the full video. The computing device can generate a frame object for displaying the video preview when the frame object is located on a display of a computing device. In response to the frame object moving to a particular location on the display, the frame object may be configured (e.g., by the computing device) to play the video preview within the frame object.

More than one frame object may be supported as well. For example, when a second video preview is received, the computing device generate a frame object for displaying the second video preview when the frame object is located on a display of a computing device. In response to the second frame object moving to a particular location on the display, the second frame object may be configured (e.g., by the computing device) to play the second video preview.

In some embodiments, the video preview may be configured to stop playing (e.g., by the computing device). For example, a first video preview may be stopped from playing when the second frame object is located at the particular location on the display in the GUI. In another example, the video preview may be stopped from playing when an activation device (e.g., finger, mouse pointer) touches or taps on a screen of the computing device, or when the frame object is configured to stop playing after a certain number of iterations.

III. Playing a Video Preview

Video previews and/or frame objects can be created to display the video preview in a particular location on a screen. Video previews may be activated and selected. For example, a video preview can be configured to play a series of images when the video preview is tapped or selected by a user (e.g., activated) and retrieve a full video when the video preview is tapped or selected a second time (e.g., selected). The video preview may also be configured to be activated based on its location in a screen. In some examples, the particular location on the screen can be identified by a region of the screen, defined by two boundary lines, or just one (e.g., center) line.

Figure 3:
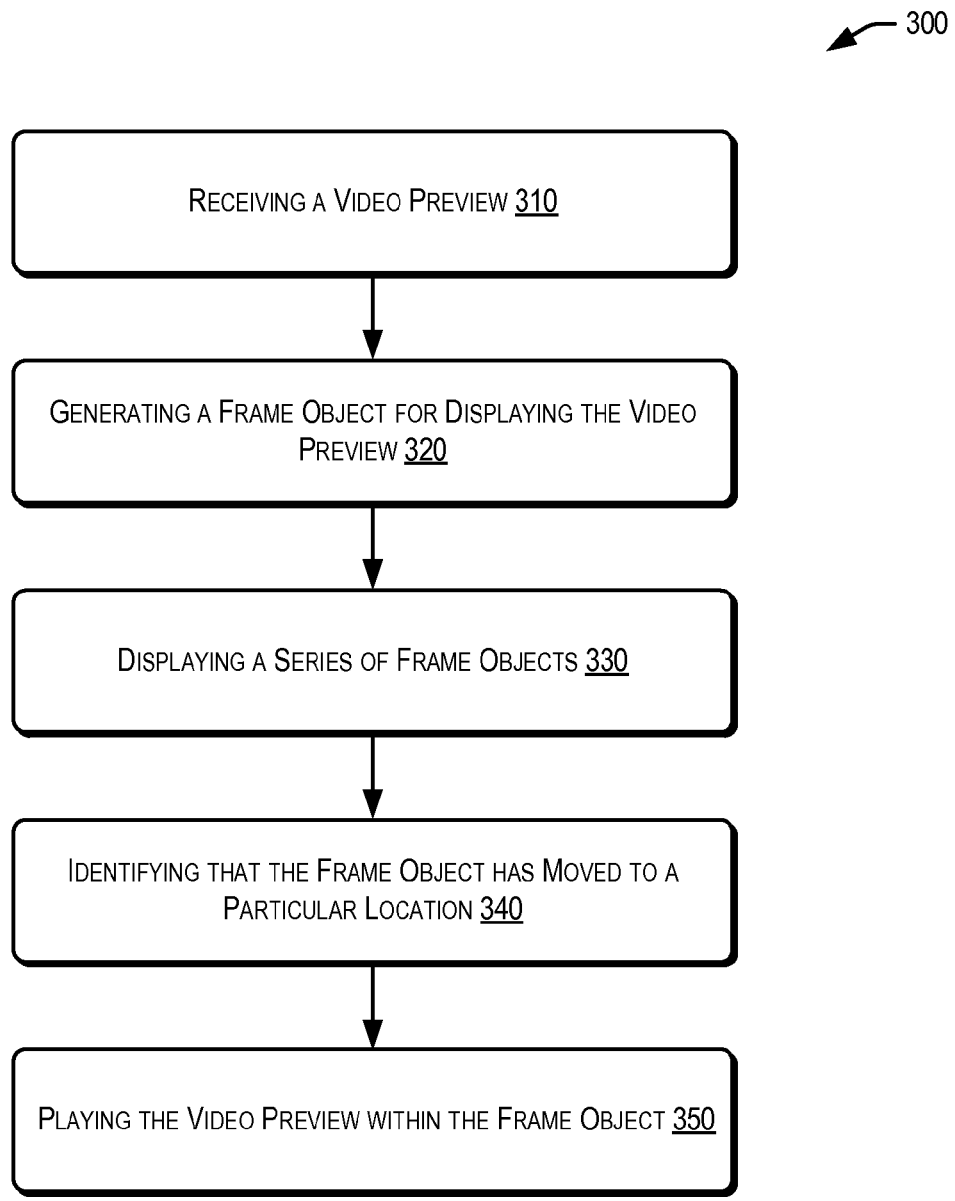
FIG. 3 shows a flowchart illustrating a method of generating a video preview object according to an embodiment of the present invention.

FIG. 3 shows a flowchart illustrating a method of generating a video preview object according to an embodiment of the present invention (e.g., performed by a computing device including a user device 230). In some embodiments, a video may begin as a series of frames or images (e.g., raw format) that are encoded by the video server 210 into a full video. The full video may reduce the size of the corresponding file and enable a more efficient transmission of the full video to other devices (e.g., provider server 220, user device 230). In some embodiments, the provider server 220 can transcode the full video (e.g., change the encoding for full video to a different encoding, encoding the full video to the same encoding or re-encoding) in order to generate and transmit the video preview. For example, transcoding may change the start time of a video, duration, or caption information.

The user may create a video preview that may later be accessed by a viewer. For example, the user may select the best 1-10 seconds of a video to convey the essence of the full video. The video preview can be shorter (e.g., fewer images, less time) than a full (e.g., more images, longer time, substantially complete) video. In some embodiments, the video preview comprises less than five percent of the images from the full video, or another relatively small number of images in comparison to the full video. The system associated with the GUI may generate a smaller file to associate with the video portion (e.g., animated GIF, MP4, collection of frames, RIFF). The system may provide the GUI on a variety of systems. For example, the GUI can be provided via an internet browser or client application (e.g., software configured to be executed on a device) and configured to run on a variety of devices (e.g., mobile, tablet, set-top, television).

At block 310, a computing device receives a video preview. For example, a provider server 220 can transmit a video preview to a user device 230 or a third party server 240 through a GUI or application (e.g., a web browser). The video preview may comprise a set of images, e.g., from a portion of a full video, multiple portions from one full video, or multiple portions from multiple full videos.

In one embodiment, the computing device can be used to browse a website that contains video previews. For example, a browser can be used to access a server that stores the video previews. The server can send video previews to the computing device (e.g., user device 230). The server can send a series of video previews at one time, so that a browser of the computing device can display the video previews consecutively without having to wait for communications from the server to provide a next video preview.

At block 320, a frame object is generated for displaying the video preview. For example, the video preview may play the set of images within the frame object when the frame object is located at a particular location on a display in a GUI of a computing device. The frame object may be configured to play the video preview within the boundaries of the object.

At block 330, a series of frame objects may be displayed (e.g., in a GUI). For example, the series can include the frame object. In some embodiments, the GUI can allow motion of the frame objects in the GUI. In some embodiments, the user may touch a surface of the computing device that displays the GUI or use an activation device to move the frame objects. For example, when two frame objects are displayed on the GUI, the user can swipe the screen (e.g., touch a surface of a computing device and drag an activation device, including a finger, mouse pointer, etc.) to move the second frame location to the particular location on the display.

Figure 6:
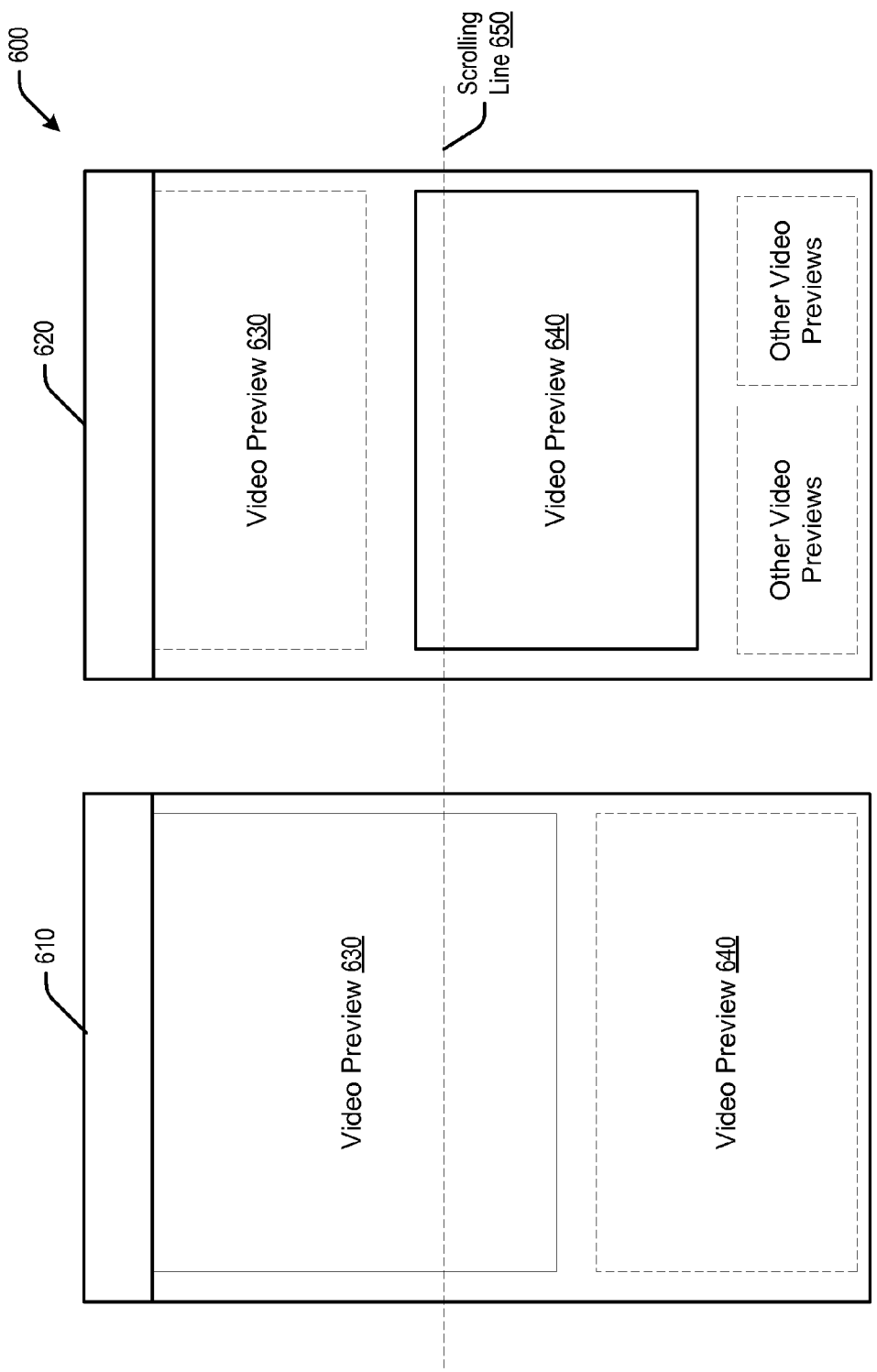
FIG. 6 illustrates video previews that are configured to play based on the location of other video previews preview according to an embodiment of the present invention.
Figure 7:
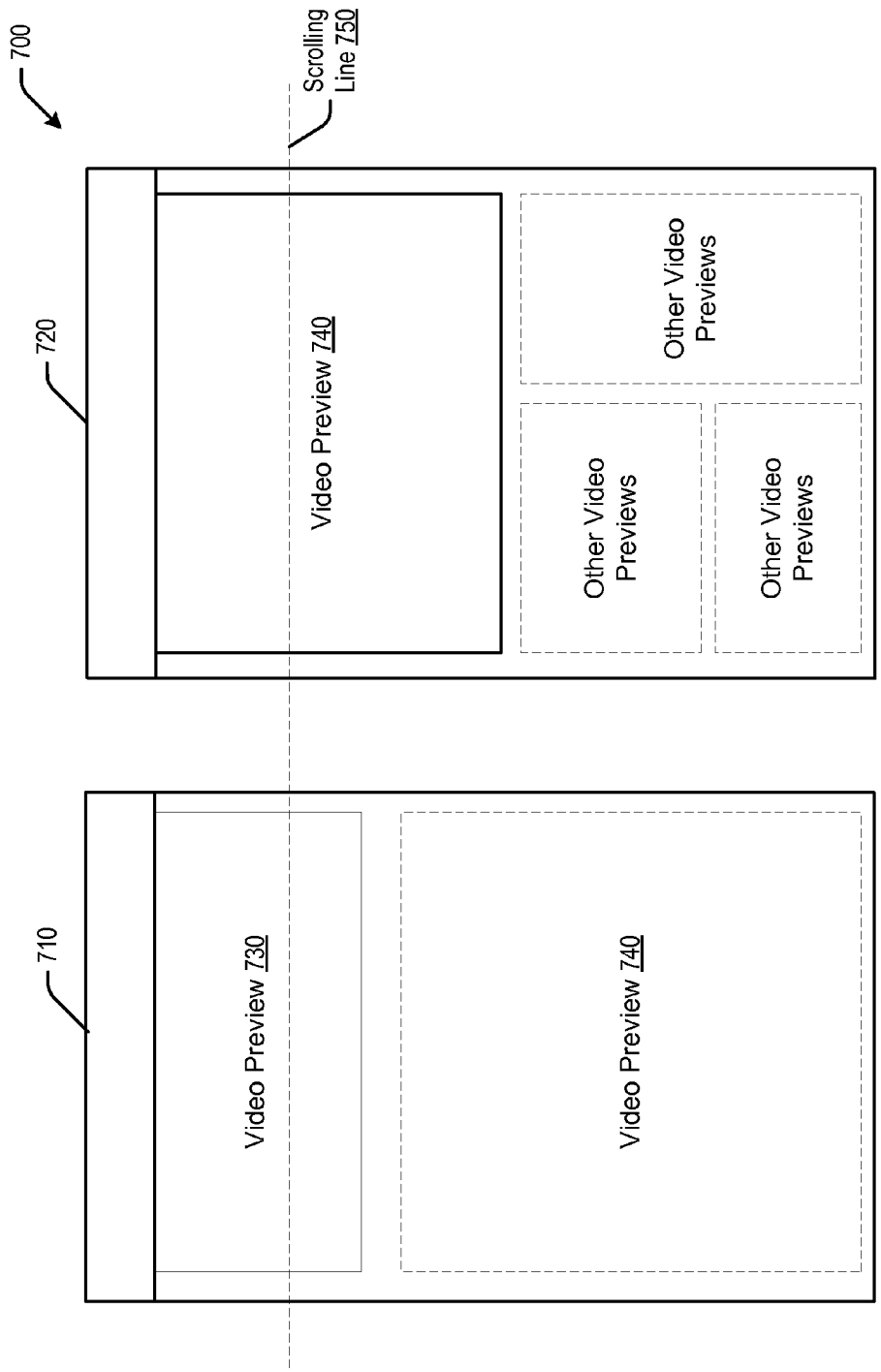
FIG. 7 illustrates video previews that are configured to play based on the location of other video previews according to an embodiment of the present invention.

At block 340, the frame object can be identified as having moved to a particular location. For example, the computing device may identify that the frame object has moved to a particular location on the display in the GUI. The computing device may identify the current location of the frame object (e.g., pixel location, relative window location, in relation to a "scrolling line" as shown in FIGS. 6-7, etc.) and compare the current frame location with the particular location (e.g., as defined within the GUI, defined by the video preview, or defined within the frame object using data obtained from the GUI or a server). When the video preview is placed in a particular location (e.g., the middle of a browser window, 10 pixels from the edge of the screen, in screen), the video preview can be activated.

The movement to a particular location on the display may activate the video preview. When the user activates the video preview (e.g., by swiping the frame object to the left so that it is in the middle of the screen, playing video previews simultaneously, one visible video preview). In some embodiments, the user may touch a surface of the computing device that displays the GUI or use an activation device to activate the frame objects. For example, when two frame objects are displayed on the GUI and the first frame object is playing the first video preview, the user can swipe the screen (e.g., touch a surface of a computing device and drag an activation device, including a finger, mouse pointer, etc.) to activate the second video preview.

The deactivation of a preview can be similarly determined by a location, which may be the same or different than the particular location used for activation. For example, the video can be activated when it leaves the particular location or reaches another location. Various embodiments can restrict the number of previews playing at any one time.

At block 350, the video preview may be played within the frame object. For example, the video preview may be played in response to movement. Once the frame is identified as moving or at the point where the frame object has moved to a particular location on the display, the video preview may be played within the frame object.

Once the activation is identified, the browser can play the video portion. For example, the browser can play the video portion in a continuous loop, a limited loop that would stop after a certain number of times, or stop after one time. The browser may also play the video preview forwards and/or backwards.

A. Composites

Composites may be supported. For example, a composite may be an area where one or more related video preview blocks will be played, each video preview in a composite linking to the same full video. When a 2×2 composite is placed in a particular location (e.g., more than 50% visible to a user, in the middle of the browser, when the adjacent video preview is fully viewable), the video preview can be activated. In yet another embodiment, the location of other video previews around a first video preview can determine when the first video preview is activated. In still another embodiment, a first video preview can be activated once an adjacent video preview has played once.

In an embodiment, frame objects can be associated with a composite of video previews. For example, a first frame object can be associated with a composite of video previews, which includes one or more frame objects that move together when one of the frame objects is moved in the GUI. The first frame object can display a first video preview. When the composite of video previews is activated, the first video preview can play. Other frame objects may also be displayed by the GUI. For example, when a second frame is displayed that is not part of the composite of video previews, the second frame object may play. Alternatively, in response to identifying that the composite of video previews is located at the particular location in the GUI of the computing device, the video previews associated with the composite of video previews can play instead of the second video preview. In some examples, the video previews associated with the composite of video previews can play simultaneously, without also playing the second video preview associated with the second frame object.

B. Selecting Video Preview

The user may also select the video preview (e.g., double-tapping the video preview, double-clicking) and the browser can transmit a selection request to the server. The computing device can retrieve the link associated with the full video (e.g., from a data store associated with the video server 210, the data store that stores the full video in an original location). For example, in response to receiving a selection of the frame object from a user, the full video may be played. The full video can correspond with the video preview and include at least a portion of the set of images that were included in the video preview.

In an embodiment, the computing device may also retrieve metadata (e.g., title, caption). For example, if the viewer of the video preview uses a web browser that translates all webpages and text to Spanish, the caption can be translated to Spanish as well. The caption may be adjusted by color, font, size, position on a screen, or other options as well. The caption may be a "soft caption" that is independent of a video preview file, instead of a "hard caption" that is part of the file format. Metadata may also include categories or classifications of the video preview (e.g., to help organize a video preview on a display).

The browser can display the full video from the link or an application. The location of the full video can be from an external location (e.g., by services provided by Hulu®, Netflix®, iTunes®) or internally at the computing device. In an embodiment, the full video can continue seamlessly from the point when the video preview stopped.

IV. Browsing One or More Video Previews

Users may browse to one or more video previews through the use of a computing device (e.g., user device 230). The video previews can be displayed via a software application, like a graphical user interface (GUI), web browser, television, or other methods of viewing digital images.

A. GUI for Browsing Video Previews

Figure 4:
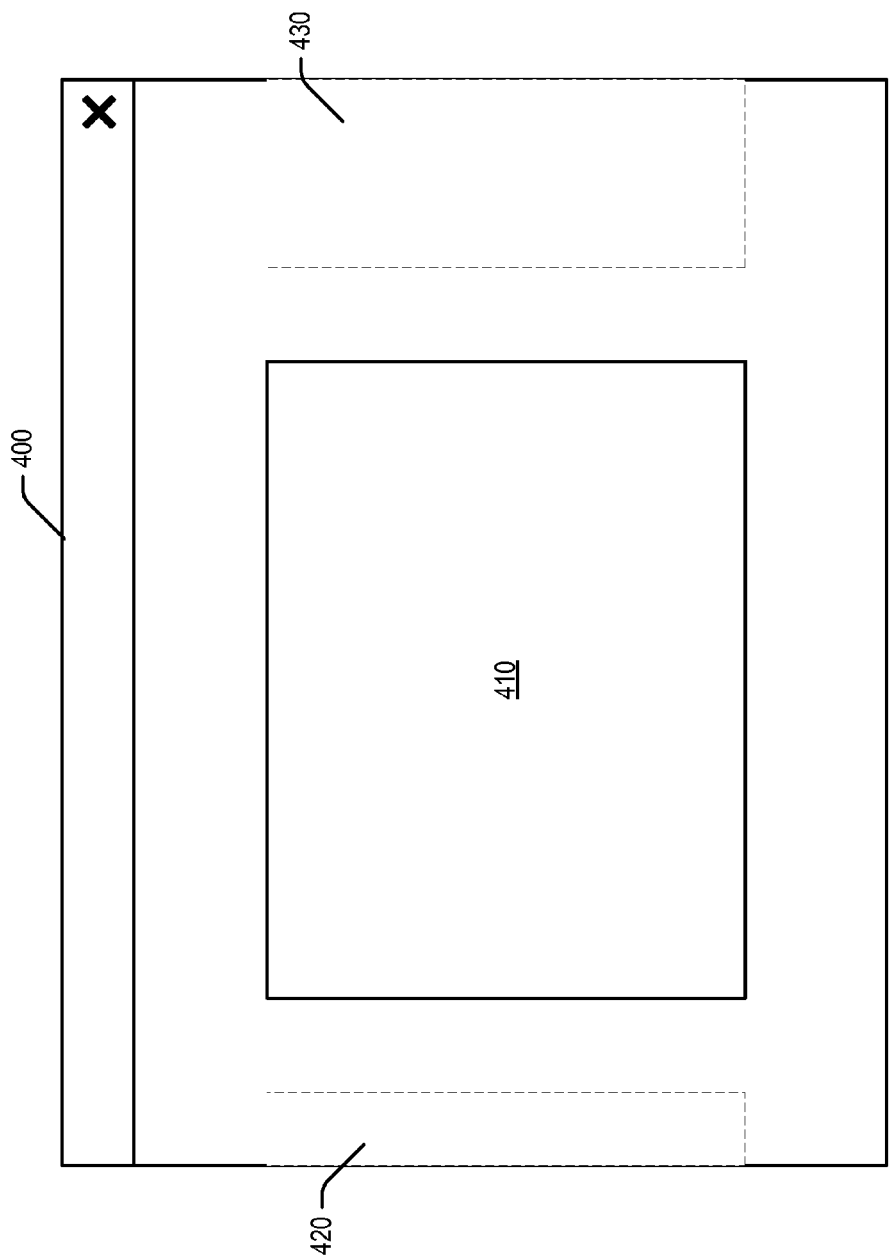
FIG. 4 shows a graphical user interface for browsing one or more video previews according to an embodiment of the present invention.

FIG. 4 shows a GUI for browsing one or more video previews according to an embodiment of the present invention. The GUI 400 can allow a user to browse a plurality of video previews through one or more frame objects 410, 420, 430. The series of frames may be reserved locations associated with the GUI for static images, video previews, and the like. The series of frame objects may comprise a first frame object 410, a second frame object 420, and a third frame object 430. The GUI 400 may also include a series of menu options, a selected menu option, a channel, a background, or other information for browsing and playing video previews.

As shown, more than one frame object may be displayed at a particular time. For example, a first frame object and second frame object can be displayed at the same time, so that at least a portion of the first and second frame objects are displayed by the GUI simultaneously. Displaying the frame objects may not be a factor in playing the video preview, which may instead rely on the location of the frame on the display or the activation of associated frame objects in a composite.

The frame objects may be placed at relative positions in the GUI for the video previews to play. Each position may or may not have a playing video preview. In an embodiment, the first frame 410 can play the video preview because the first frame is located in substantially the middle of the GUI. The second frame 420 and the third frame 430 would not be in the middle of the screen, so these frames could display a static image or a portion of the static image associated with the video preview.

In an embodiment, the viewer can activate the thumbnail associated with the video preview by zero-click viewing (e.g., based on the location of the video preview and not a click or selection of a video preview). For example, once a video preview is placed in a particular location (e.g., the middle of a browser window, 10 pixels from the edge of the screen, off screen, in screen), the video preview can be activated.

In some embodiments, the activation by the user can transmit an activation request from the browser to a computing device. In other embodiments, the activation may be contained within the frame objet, so that no correspondence is needed between the frame object and the computing device. For example, the computing device can retrieve a cataloged video portion associated with the activation request. The computing device can transmit the video portion to the browser (e.g., receive a video preview from a video server 210 and forward to a browser, receive a video preview from a data store with a provider server 220 and forward to a user device 230).

In some embodiments, the frame object may represent a link to a full video or video channel. The viewer can select (e.g., double-tap, click) the activated video preview to access the full video. The viewer may be redirected to another application to view the full content. For example, a viewer may view Scarface on a GUI related to one of several video services (Netflix®, Hulu®, Comcast® television) from her iPad. Alternatively, the viewer may open a browser tab to watch the full video, outside of the GUI disclosed herein. In another instance, the full video could play in the same place as the video preview in the GUI. In some embodiments, the channels may be organized and socially curated. A curator can decide the order and programming.

The series of frames can move to different locations in the GUI 400. For example, first frame 410 may be activated automatically because it is located in substantially the middle of the screen. The viewer can swipe the first frame 410 to the left. In response, the GUI would move the first frame 410 to the left-side of the screen and the second frame 420 would be placed in the middle of the screen. The third frame 430 may not be visible after the swipe. The second frame 420 could be automatically activated, because it is located in the middle of the screen, and the first frame 410 would no longer be activated, because it is on the left-side of the screen. When activated, the second frame 420 would provide the location for the video preview associated with the second frame to play.

In an embodiment, the video preview can begin to play in a near immediate response to a user's activation (e.g., when the video preview is in the middle of a screen and playing instantly) or selection (e.g., when the video preview was activated and began playing, and the user has double-tapped the location of the video preview to initiate the complete video). For example, the video preview may play for the user when the image file has not completely loaded on the device. This may be advantageous because the user can get a substantially immediate response from the GUI and a more gratifying video preview experience.

In some embodiments, a video preview can play in response to selecting a frame object. For example, in response to selecting a first frame object, a second frame object can be provided that displays additional content that corresponds to the video preview. The second frame object can be displayed in the GUI (e.g., with the first frame object, in a new GUI without the first frame object).

In some embodiments, the video preview can play automatically or independent of a receiving an activation of the video preview from a user. For example, when the browser opens at a computing device, the video preview can start playing.

In some embodiments, the video preview can be activated or selected in response to an activation device (e.g., a finger, mouse pointer, keyboard shortcuts). For example, the frame object and/or video preview can be activated by placing an activation device in a substantially close proximity to a location of the frame object. In another example, the activation may occur when the activation device is placed over the location of the frame object (e.g., hovering). The video preview may be selected in response to an activation device as well. For example, the frame object is selected by placing an activation device in a substantially close proximity to a location of the frame object and clicking or tapping the frame object.

Further, the video previews may be encoded as images. This may be advantageous because the video preview could be shorter in length and a smaller file size. The video preview could load quickly on most connections with little to no buffering. The video previews provided by the frame object can play as the frame object is loaded.

Embodiments can provide a website or client application where users can browse short video previews and watch the full video or channel that is represented by the video preview. The website may provide additional aspects of video browsing, including a series of menu options, a selected menu option, one or more channels that organize the video previews, and a background. The series of menu options can be a list of categories (e.g., sports, movies, comedy). The menu option may become a selected menu option by being selected or touched. The channel can be a collection of frame objects for a particular category. The background may be a static image located behind the video previews, series of menu options, and channel. The background could be a video playing the background of the current selected channel. The GUI can be designed to let viewers browse videos, while still consuming the video that they had previously selected.

Figure 5:
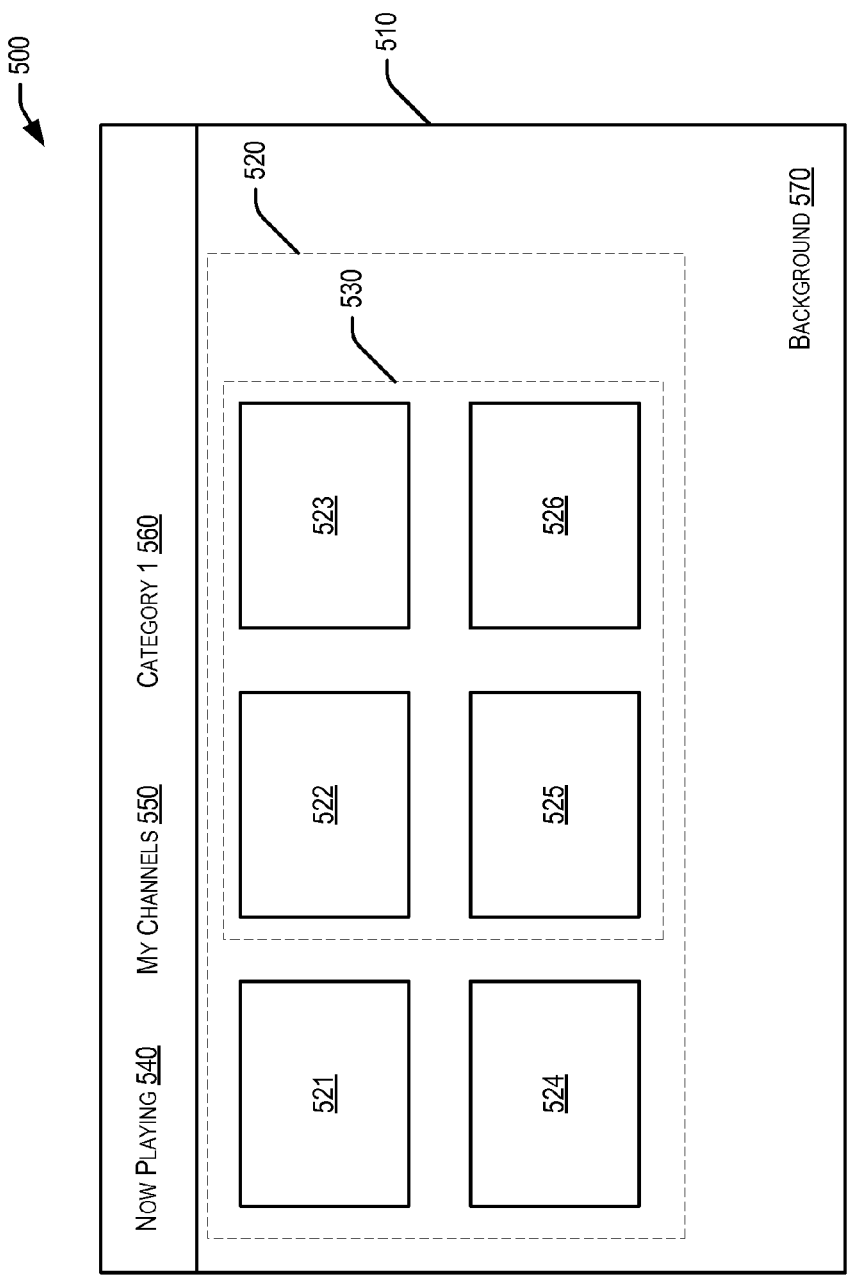
FIG. 5 shows a graphical user interface for browsing one or more video previews according to an embodiment of the present invention.

FIG. 5 shows an alternative GUI for browsing one or more video previews according to an embodiment of the present invention. For example, the GUI 500 on a computing device (e.g., mobile device, tablet, web browser, TV) can enable users to browse a hierarchy of video previews (e.g., video preview in a frame object, composite, cluster, channel). The GUI 500 can include an area for video previews 510, one or more channel previews and/or frame objects 520 (e.g., 521, 522, 523, 524, 525, 526), one or more playable groups of video previews or frame objects 530, a menu 530 (e.g., 540, 550, 560), and a background 570.

The one or more channel previews and/or frame objects 520 can be representative of a channel, where a channel is a collection of video previews of full videos of a same category. A channel preview can corresponds to a video preview of the channel, a collection of video previews of the channel, or be a new video preview that is created from one video or multiple full videos of the channel. For example, when the user activates a frame object 521, the video preview associated with the frame object can start playing. When the user selects the frame object 521, the user can be directed to a channel of video previews, e.g., a GUI as depicted in FIG. 4. The video previews in the channel may be related (e.g., via metadata, by categories). In an embodiment, the activated channel on the GUI plays an associated video preview.

When the frame object is not activated, the video preview may not play. In some instances, the frame object can show thumbnail images in place of the activated video preview. When a user swipes, hits the right/left arrows or clicks, additional channels may be visible on the GUI and the video preview for a particular channel can play automatically.

In some embodiments, the user can select (e.g., double-tap, click) the activated video preview to access the full video. When the video preview represents a channel of videos, selecting the video preview may allow the user to access the full videos associated with the channel.

In one embodiment, one video preview may be activated by default. The video frame may be highlighted to signify that the frame has been activated and the video preview associated with the frame may begin to play at the location of the frame. The user can view the GUI on a device that displays an indicator (e.g., mouse pointer). When the indicator is located in near proximity to a channel (e.g., rolling over the channel location), the video preview may being to play immediately.

In some examples, the series of frames 520 may be locations of channels and each channel location can display a static image (e.g., a thumbnail) or a video preview. In an embodiment, the series of frames 520 may be displayed as a grid, such that there are multiple frames in each row and multiple frames in each column.

The first frame 521 may be activated by default (e.g., because it is located in the upper left-hand corner of the series of frames 520) and play a video preview without the user's instructions (e.g., tapping, hovering a mouse pointer, swiping). In an embodiment, the first frame can be highlighted by a thicker border around the video preview to signify that the first frame 521 has been activated. When the user selects (e.g., double-tap, click) the activated video preview for a channel, the device may display a GUI so that the user can access the full videos associated with the channel.

A user may activate another channel (e.g., by placing a mouse pointer or indicator in near proximity to a channel), in which the video preview associated with that channel may begin to play. For example, if the user activates the second frame 522, a thicker border may be placed around the second frame 522 and the video preview associated with the second frame 522 can begin to play.

The frame objects can form a playable group 530 (e.g., including 522, 523, 525, 526). For example, when an activation of frame object 521 moves to frame object 522, the frame objects associated with frame object 522 (e.g., 523, 525, 526) can also begin to play because they are part of playable group 530. In some examples, the playable group 530 can be associated with a single full video, such that when any of the frame objects associated with the playable group is selected, the GUI will display the full video associated with the playable group 530.

Other functionality may be provided by GUI 500 as well. For example, the user may be able to browse any video previews that are highlighted or currently playing 540, any collections or channels 550 that the user is associated with, and video previews or channels associated with a particular category 560. A background 570 may also appear on the GUI 500 (e.g., thumbnail, video preview, text).

B. Identifying that the Frame Object Moves to a Particular Location

FIG. 6 illustrates video previews that are configured to play based on the location of other video previews preview according to an embodiment of the present invention. As shown, the cluster of video previews in GUI 610 includes a first video preview 630, a second video preview 640, and a scrolling line 650. For example, the first video preview 630 may be a composite of video previews in a 1×2 grid (1 column by 2 rows) from a cross country driving video showing a car driving near snow, and the second video preview 640 may be a composite of video previews in a 1×2 grid from a racing video showing a car drifting on an empty freeway. These two sets of videos can be grouped in a cluster and played for the user simultaneously.

When a cluster of video previews comes into view, the cluster can start playing. The videos associated with the cluster of video previews can be grouped by any method, including when the video previews share a visual consistency and/or come from a similar category. The consistency can make logical sense to avoid seeming jarring for the user. The cluster can also portray visual beauty.

The plurality of video previews can be configured to play based on the location of other video previews. For example, as shown in GUIs 610 and 620, the layout shows two video previews, a first video preview 630 and a second video preview 640. In GUI 610, the first video preview 630 is playing and the second video preview 640 is not playing. In this embodiment, the second video preview 640 is fully displayed, but it has not been activated while the first video preview 630 is still activated. The activation of the second video preview can be dependent on the activation of the first video preview. In GUI 620, the second video preview is activated and playing the video preview, once the first video preview is no longer activated. For example, the video preview may become active as it moves toward the middle of the display.

C. Identifying a Scrolling Line

As illustrated in FIG. 6, a scrolling line 650 can be identified to determine which video preview can be activated to play at a particular location. The scrolling line 650 may be an invisible line across the screen of the user device 230 that helps identify which video preview (e.g., or playable group of video previews, cluster of video previews, etc.) should play at a particular time.

The approach for determining which playable groups play as the user scrolls through a grid of items depends on several ideas. For example, playable groups are generally constructed such that their height may not exceed the height of the screen of the user device 230. In another example, some playable groups can play by default (e.g., when the screen views the top of the layout, the first playable group should play, when the screen views the bottom of the layout, the last playable group should play, etc.). For playable groups near the middle of the layout, a scrolling line may be used to determine which playable group can play (e.g., if more than one playable group is visible on the screen of the user device 230).

When the user has scrolled to a particular location, the GUI can compute the position of the scrolling line 650 on the screen of the user device 230. For example, the determination of the scrolling line position "s," given a "y" offset (e.g., y can represent the amount by which the user has scrolled down from the top) can be expressed by the following general formula, with "v" as the height of the screen at the user device 230 and "c" as the height of the video previews in the layout (e.g., the grid):

When $y<v, s=(3/2)y$

When $v \leq y \leq 2v, s=y+(v/2)$

When $y>2v, s=y+v-(1/2)(c-v-y)$

Some optimizations and/or special considerations may be made. For example, if the content height is less than thrice the view height, but greater than twice the view height, the scrolling line may be a line from 0 to c. The scrolling line position can be expressed in the following formula:

When $2v \leq c < 3v, s = y(c/(c-v))$

In another example, a padding can be added to the layout. For example, when a short grid is considered, the padding can help ensure that the last playable group can play (e.g., a scrolling line from 0 to c may not play the last playable group because the user may not be able to scroll far enough for the scroll line to intersect the last playable group). The padding can be added to the height of "c" (e.g., the height of the video previews in the layout), such that c=2v and:

When a short grid or $c=2v, s=2y$

Once the scrolling line is determined, the playable group that is currently intersecting the scrolling line may play. For example, the GUI may analyze contiguous offset ranges of each of the playable groups and/or cluster of video previews and place them into an interval tree (e.g., a binary interval tree that permits O(log(n)) analysis and/or lookups). An interval may be a set of real numbers with the property that any number that lies between two numbers in the set is also included in the set. The interval tree may use these intervals to allow an efficient lookup of playable groups. The lookup can find the intervals that overlap with any given interval. In some examples, the interval tree is dynamic (e.g., the interval tree can allow insertion and deletion of intervals dynamically).

Other data structures (e.g., ordered tree data structures in addition to an interval tree) are available as well without diverting from the essence of the invention. For example, leaf contiguous intervals can be stored in an interval tree with a linked list. This can permit linear-time traversal for slow scrolling (e.g., when the user is progressing linearly from one interval to the next). The tree can allow for efficient lookups if the user scrolled very quickly from one position in the grid to another. In another example, a skip list can be used. A skip list can also permit general logarithmic random lookups, but also simultaneously permits linear traversal of the data.

D. Identifying that a Second Frame Object is Still Active

FIG. 7 illustrates video previews that are configured to play based on the location of other video previews according to an embodiment of the present invention. As shown, GUIs 710 and 720 include a plurality of video previews. GUI 710 can display a plurality of video previews 730, 740 and GUI 720 can represent the same video previews at a later point in time. A scrolling line 750 may also be calculated. As shown, the video previews with a solid line are illustrated as active video previews and the video previews with a dashed line are illustrated as not active video previews. For example, video preview 730 may be playing at the time associated with GUI 710 and may be off-screen at the time associated with GUI 720. Video preview 740 may be viewable at both times associated with GUI 710 and GUI 720.

As shown in GUI 710, the first video preview 730 occupies nearly ⅓ of the screen, while the second video preview 740 occupies nearly ⅔ of the screen. However, the second video preview 740 may not be activated (e.g., based on the configuration when generated, based on a location relative to other video previews in a composite). As shown in GUI 720, the second video preview 740 may still be activated even though the video preview is not fully displayed. The activation may be due to the calculation of the scrolling line 750 and determining which one or more video previews are intersecting the scrolling line 750 at a particular point of time.

E. Determination of Location(s)

As shown in FIGS. 4-7, the frame objects and/or video previews can occupy various portions of the screen to be activated, including the middle of the viewable area, center, left, right, outside the viewable area, or substantially close to any such location. The computing device may determine the location of the frame object in a variety of ways. For example, the computing device (e.g., provider server 220, user device 230) can create a frame object that identifies the coordinates of the object. When the frame object is loaded at a particular coordinate setting, the frame object can be activated and play the video preview within the frame object. In another example, the computing device can create the frame object to compare other object properties (e.g., imageview, button, iframe) with the user device's provided display specifications (e.g., scrollview.bounds). In yet another example, the computing device can create a frame object that identifies the frame object in relation to a group of frame objects (e.g., cluster, composite) and automatically start playing the video preview displayed by the frame object when the preview frame object starts playing (e.g., in a composite) or when the previous frame object stops playing (e.g., in a cluster).

F. Correlation with Audio

Figure 8:
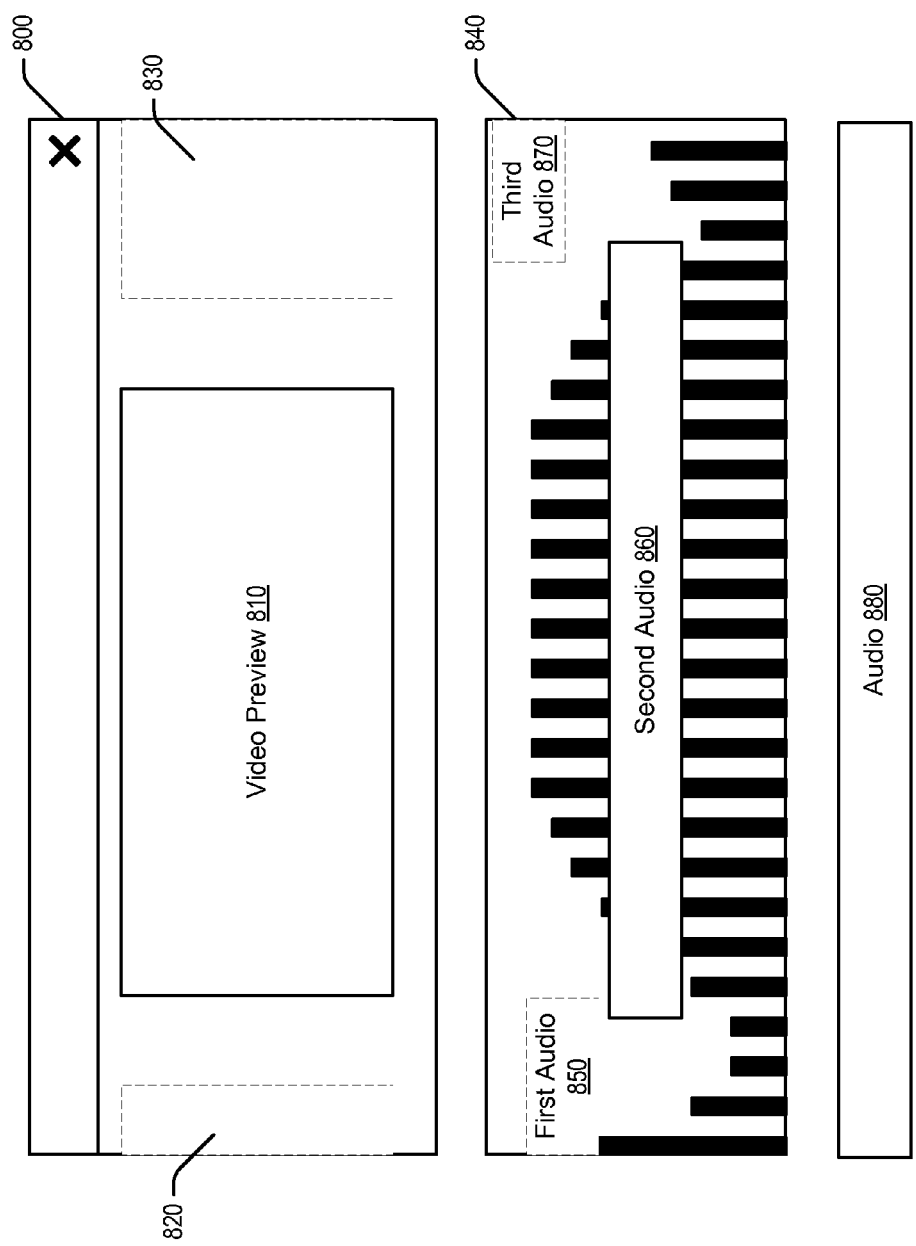
FIG. 8 illustrates the correlation of video previews with audio according to an embodiment of the present invention.

FIG. 8 illustrates the correlation of video previews with audio according to an embodiment of the present invention. The GUI 800 can include one or more video previews 810, 820, 830 and corresponding audio. The audio may correlate with the video preview, such that video preview 820 corresponds with a first audio 850, video preview 810 corresponds with a second audio 860, and video preview 830 corresponds with a third audio. Alternatively, a general audio file 880 can correspond with the plurality of video previews.

Audio may correlate with one or more video previews. For example, a GUI 840 can display one or more audio files associated with one or more video previews in a temporal-based interface (e.g., the x-axis/horizontal-axis is the progression of time in which the audio plays). The user may be able to view or adjust (e.g., dragging, tapping, clicking, sliding) a visual representation of the audio (e.g. 850, 860, 870, the background of GUI 840) in order to correlate the audio as the audio plays with the video preview (e.g., duration, pitch, volume, fading) through the use of the GUI 840. In another example, the computing device can adjust the audio. Additional information relating to audio with video previews can be found in U.S. patent application Ser. No. 14/173,740, entitled "Video Preview Creation with Audio", which is incorporated by reference.

When audio corresponds with a particular video preview, the location of the video preview may affect the audio (e.g., pitch, volume, fading, Doppler shift). For example, the audio may play while these previews are selected and/or activated, and the video associated with these groups of video previews are playing. The audio associated with other composites may be silent. When a user swipes or changes the focus (e.g., clicks on an object displayed by the GUI other than the video preview) so that other video previews and/or frame objects become activated, the system can gauge, in a Doppler Shift-like audio effect, how the audio would change if an object was moving farther away from the user.

In another example, the pitch may change to seem like one video preview is physically moving farther away from the user. For example, when first audio 850 corresponding with video preview 820 is moved from one location to another location (e.g., from the center location to the far left location, partially off the screen), the pitch for first audio 850 may be adjusted to simulate that the source of the audio is moving farther from the user. In another example, when second audio 860 corresponding to video preview 810 is moved from one location to another location (e.g., from far left location to the center location), the pitch for second audio 860 may be adjusted to simulate that the source of the audio is moving closer to the user. The pitch may also change for the audio associated with other composites to simulate the videos physically moving closer to the user.

In some embodiments, the audio may fade in or out. For example, there may be one video preview associated with one audio on a GUI. When the video preview appears on the screen (e.g., moving from right to left, video preview 810), the audio can fade in as the video preview moves closer to the center of the screen. The audio may also fade out the farther the video preview moves to the center of the screen (e.g., near the location of video preview 830). In another example, in response to identifying that the frame object is located at the particular location on the display in the GUI of the computing device, the audio can be faded in or out, irrespective of the location of the video preview to the center of the screen (e.g., top of the screen to bottom of the screen, closer or farther from the corner of the screen).

When more than one video preview is identified on a GUI, the locations of both video previews can affect the audio. For example, in response to identifying that the first frame object is located at the particular location on the display in the GUI. A first audio file (that corresponds with the first video preview) can fade out and a second audio file (that corresponds with the second video preview) can fade in.

G. Sharing for Others to Browse

In one embodiment, users can share video previews through communication mechanisms such as social networks and email. Because the video previews are relatively small (e.g., a short duration, small file size, encoded to be easily transmittable), the video previews can be compelling to share with other people. In addition because the file-size of the video moment can be small, it can be embedded in the communication mechanism so that when the message is opened, the video moment will play instantly. This can further increase the virality of a video-moment, as a recipient may not need to click on a link to see the video-preview, and instead the recipient can see it play immediately, making it more likely that the recipient will forward the video previews on to other people. For instance, a video preview could be attached to an email, and the video preview could play instantly when another user receives the email. Alternatively, the video preview could be posted to social networks such as Facebook® or Twitter® and could play automatically within a stream of content the user is browsing.

V. Example Subsystems and Components

Figure 9:
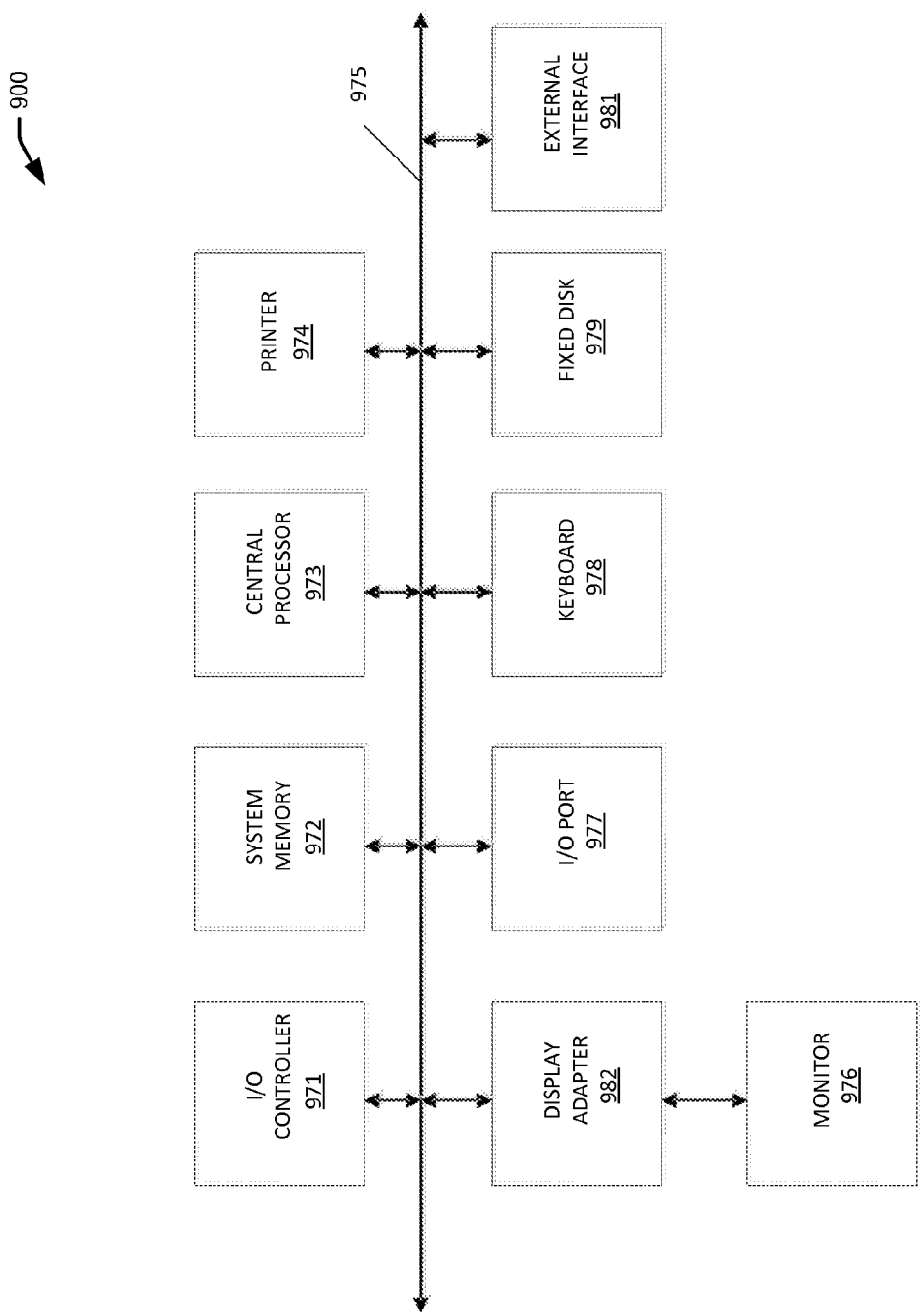
FIG. 9 shows a block diagram of a computer apparatus according to an embodiment of the present invention.

Any of the clients or servers may utilize any suitable number of subsystems. Examples of such subsystems or components are shown in FIG. 9. The subsystems shown in FIG. 9 are interconnected via a system bus 975. Additional subsystems such as a printer 974, keyboard 978, fixed disk 979, monitor 976, which is coupled to display adapter 982, and others are shown. Peripherals and input/output (I/O) devices, which couple to I/O controller 971, can be connected to the computer system by any number of means known in the art, such as input/output (I/O) port 977 (e.g., USB, FireWire®). For example, I/O port 977 or external interface 981 (e.g. Ethernet, Wi-Fi, etc.) can be used to connect the computer apparatus to a wide area network such as the Internet, a mouse input device, or a scanner. The interconnection via system bus allows the central processor 973, which may include one or more processors, to communicate with each subsystem and to control the execution of instructions from system memory 972 or the fixed disk 979 (such as a hard drive or optical disk), as well as the exchange of information between subsystems. The system memory 972 and/or the fixed disk 979 may embody a computer readable medium. Any of the data mentioned herein can be output from one component to another component and can be output to the user.

It should be understood that any of the embodiments of the present invention can be implemented in the form of control logic using hardware (e.g. an application specific integrated circuit or field programmable gate array) and/or using computer software with a generally programmable processor in a modular or integrated manner. As user herein, a processor includes a multi-core processor on a same integrated chip, or multiple processing units on a single circuit board or networked. Based on the disclosure and teachings provided herein, a person of ordinary skill in the art will know and appreciate other ways and/or methods to implement embodiments of the present invention using hardware and a combination of hardware and software.

Any of the software components or functions described in this application may be implemented as software code to be executed by a processor using any suitable computer language such as, for example, Java®, C++ or Perl using, for example, conventional or object-oriented techniques. The software code may be stored as a series of instructions or commands on a computer readable medium for storage and/or transmission, suitable media include random access memory (RAM), a read only memory (ROM), a magnetic medium such as a hard-drive or a floppy disk, or an optical medium such as a compact disk (CD) or DVD (digital versatile disk), flash memory, and the like. The computer readable medium may be any combination of such storage or transmission devices.

Such programs may also be encoded and transmitted using carrier signals adapted for transmission via wired, optical, and/or wireless networks conforming to a variety of protocols, including the Internet. As such, a computer readable medium according to an embodiment of the present invention may be created using a data signal encoded with such programs. Computer readable media encoded with the program code may be packaged with a compatible device or provided separately from other devices (e.g., via Internet download). Any such computer readable medium may reside on or within a single computer program product (e.g. a hard drive, a CD, or an entire computer system), and may be present on or within different computer program products within a system or network. A computer system may include a monitor, printer, or other suitable display for providing any of the results mentioned herein to a user.

Any of the methods described herein may be totally or partially performed with a computer system including one or more processors, which can be configured to perform the steps. Thus, embodiments can be directed to computer systems configured to perform the steps of any of the methods described herein, potentially with different components performing a respective steps or a respective group of steps. Although presented as numbered steps, steps of methods herein can be performed at a same time or in a different order. Additionally, portions of these steps may be used with portions of other steps from other methods. Also, all or portions of a step may be optional. Additionally, any of the steps of any of the methods can be performed with modules, circuits, or other means for performing these steps.

The specific details of particular embodiments may be combined in any suitable manner without departing from the spirit and scope of embodiments of the invention. However, other embodiments of the invention may be directed to specific embodiments relating to each individual aspect, or specific combinations of these individual aspects.

The above description of exemplary embodiments of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications to thereby enable others skilled in the art to best utilize the invention in various embodiments and with various modifications as are suited to the particular use contemplated.

A recitation of "a", "an" or "the" is intended to mean "one or more" unless specifically indicated to the contrary.

What is claimed is:

1. A method of browsing videos, the method comprising:
receiving a set of video previews, wherein the set of video previews each comprise a set of images;
generating, by a computing device, a series of frame objects for displaying the set of video previews, wherein each of the set of video previews is played simultaneously and at a same start time within a corresponding frame object when the series of frame objects are located at a particular location on a display in a graphical user interface (GUI) of the computing device;
displaying, by the computing device, the series of frame objects in the GUI, the series of frame objects including the corresponding frame object, wherein the GUI allows motion of the series of frame objects in the GUI;
identifying, by the computing device, that the series of frame objects have moved to the particular location on the display in the GUI; and
playing, by the computing device, the set of video previews within the series of frame objects simultaneously and at the same start time in response to identifying that the series of frame objects moved to the particular location on the display in the GUI.

2. The method of claim 1, wherein the set of video previews is a first set of video previews, the corresponding frame object is a first frame object, and the method further comprises:
receiving a second video preview;
generating a second frame object for displaying the second video preview;
displaying the second frame object next to the first frame object in the GUI; and
in response to identifying that the second frame object is located at the particular location on the display in the GUI of the computing device, playing the second video preview within the second frame object.

3. The method of claim 2, further comprising stopping the first set of video previews from playing when the second frame object is located at the particular location on the display in the GUI.

4. The method of claim 2, wherein a user touches a surface of the computing device that displays the GUI and swipes a screen of the computing device to move the second frame object to the particular location on the display and play the second video preview.

5. The method of claim 2, wherein a section of the first frame object is displayed while the second frame object is displayed, so that at least a portion of the first and second frame objects are displayed by the GUI simultaneously.

6. The method of claim 2, further comprising:
in response to identifying that the first frame object is located at the particular location on the display in the GUI of the computing device, fading a first audio file out, wherein the first audio file is associated with the first set of video previews; and
fading a second audio file in, wherein the second audio file is associated with the second video preview.

7. The method of claim 1, further comprising in response to receiving a selection of the corresponding frame object from a user, playing a full video.

8. The method of claim 1, wherein the set of video previews play independent of a receiving an activation of the set of video previews from a user.

9. The method of claim 1, wherein the corresponding frame object is activated by placing a selection device in a substantially close proximity to a location of the corresponding frame object.

10. The method of claim 9, wherein the selection device is a finger.

11. The method of claim 9, wherein the selection device is a mouse pointer.

12. The method of claim 1, wherein the corresponding frame object is selected by placing a selection device in a substantially close proximity to a location of the corresponding frame object, and clicking the corresponding frame object.

13. The method of claim 1, wherein the corresponding frame object is selected by placing a selection device in a substantially close proximity to a location of the corresponding frame object, and tapping the corresponding frame object.

14. The method of claim 1, wherein the set of video previews comprise less than five percent of images from a full video.

15. The method of claim 1, wherein the series of frame objects is a first series of frame objects and the method further comprises:
associating the first series of frame objects with a composite of video previews, wherein the composite of video previews includes one or more frame objects that move together when one of the frame objects is moved in the GUI;
displaying a second frame object that is not part of the composite of video previews, wherein the second frame object displays a second video preview; and
in response to identifying that the composite of video previews is located at the particular location in the GUI of the computing device, playing video previews associated with the composite of video previews.

16. The method of claim 15, wherein the video previews associated with the composite of video previews play simultaneously and not playing the second video preview associated with the second frame object.

17. The method of claim 1, wherein the series of frame objects is located at the particular location when the GUI is originally displayed by the computing device.

18. The method of claim 1, wherein the series of frame objects is a first series of frame objects and the method further comprises:

in response to selecting the first series of frame objects, providing a second frame object that displays additional content that corresponds to the set of video previews, wherein the second frame object is displayed in the GUI.

19. The method of claim 1, wherein the corresponding frame object moves linearly on the display in the GUI from one end of the display in the GUI to another.

20. The method of claim 1, wherein each video preview in the set of video previews includes a different set of images.

21. The method of claim 1, wherein each of the plurality set of video previews link to a same full video.

22. The method of claim 1, wherein the set of video previews are associated with a similar category.

23. The method of claim 1, wherein the set of video previews share a visual consistency.

24. A computer product comprising a non-transitory computer readable medium storing a plurality of instructions that when executed control a computer system to browsing videos, the instructions comprising:
    receiving a set of video previews, wherein the set of video previews each comprise a set of images;
    generating a plurality of frame objects for displaying a video preview from the set of video previews, wherein each of the set of video previews is played simultaneously and at a same start time within a corresponding frame object when the plurality of frame objects are located at a particular location on a display in a graphical user interface (GUI) of a computing device;
    displaying a series of frame objects in the GUI, the series of frames objects including the corresponding frame object, wherein the GUI allows motion of the plurality of frame objects in the GUI;
    identifying that the plurality of frame objects have moved to the particular location on the display in the GUI; and
    playing the set of video previews within the plurality of frame objects simultaneously and at the same start time in response to identifying that the plurality of frame objects moved to the particular location on the display in the GUI.

25. The computer product of claim 24, wherein the set of video previews is a first set of video previews, the corresponding frame object is a first frame object, and the instructions further comprise:
    receiving a second video preview;
    generating a second frame object for displaying the second video preview;
    displaying the second frame object next to the first frame object in the GUI; and
    in response to identifying that the second frame object is located at the particular location on the display in the GUI of the computing device, playing the second video preview within the second frame object.

26. The computer product of claim 25, wherein the instructions further comprise stopping the first set of video previews from playing when the second frame object is located at the particular location on the display in the GUI.

27. The computer product of claim 24, wherein in response to receiving a selection of the corresponding frame object from a user, the instructions further comprise playing a full video.

28. The computer product of claim 24, wherein the set of video previews play independent of a receiving an activation of the set of video previews from a user.

29. The computer product of claim 24, wherein the corresponding frame object is a first frame object and the instructions further comprise:
    associating the first frame object with a composite of video previews, wherein the composite of video previews includes one or more frame objects that move together when one of the frame objects is moved in the GUI;
    displaying a second frame object that is not part of the composite of video previews, wherein the second frame object displays a second video preview; and
    in response to identifying that the composite of video previews is located at the particular location in the GUI of the computing device, playing the video previews associated with the composite of video previews.

30. The computer product of claim 29, wherein the video previews associated with the composite of video previews play simultaneously and not playing the second video preview associated with the second frame object.

* * * * *